United States Patent
Bernini

(10) Patent No.: US 11,641,792 B2
(45) Date of Patent: May 9, 2023

(54) LAWN MOWER ROBOT

(71) Applicant: Fabrizio Bernini, Bucine (IT)

(72) Inventor: Fabrizio Bernini, Bucine (IT)

( * ) Notice: Subject to any disclaimer, the term of this patent is extended or adjusted under 35 U.S.C. 154(b) by 244 days.

(21) Appl. No.: 17/028,074

(22) Filed: Sep. 22, 2020

(65) Prior Publication Data

US 2021/0084811 A1 Mar. 25, 2021

(30) Foreign Application Priority Data

Sep. 23, 2019 (IT) .................. 102019000016934

(51) Int. Cl.

| | |
|---|---|
| *A01D 34/74* | (2006.01) |
| *G01S 13/90* | (2006.01) |
| *G05D 1/02* | (2020.01) |
| *G01S 13/87* | (2006.01) |
| *A01D 34/00* | (2006.01) |
| *G01S 13/931* | (2020.01) |
| *A01D 101/00* | (2006.01) |

(52) U.S. Cl.
CPC ........... *A01D 34/008* (2013.01); *A01D 34/74* (2013.01); *G01S 13/87* (2013.01); *G01S 13/9043* (2019.05); *G01S 13/931* (2013.01); *G05D 1/0257* (2013.01); *A01D 2101/00* (2013.01)

(58) Field of Classification Search
CPC .. A01D 34/008; A01D 34/74; A01D 2101/00; G05D 1/0257; G01S 13/931; G01S 13/9043; G01S 13/87
USPC ........................................................ 700/245
See application file for complete search history.

(56) References Cited

U.S. PATENT DOCUMENTS

| | | | |
|---|---|---|---|
| 2005/0000543 A1 | 1/2005 | Taylor et al. | |
| 2016/0165795 A1* | 6/2016 | Balutis | ................. G05D 1/0265 701/25 |
| 2019/0075724 A1* | 3/2019 | Becke | ................... H02J 7/0048 |
| 2020/0050208 A1* | 2/2020 | Frick | .................... G05D 1/0221 |
| 2021/0302569 A1* | 9/2021 | Lincoln | ................ G05D 1/0257 |

(Continued)

FOREIGN PATENT DOCUMENTS

| | | |
|---|---|---|
| CN | 108781705 A | 11/2018 |
| DE | 10302908 A1 | 8/2004 |
| EP | 3324261 A1 * | 5/2018 |

(Continued)

OTHER PUBLICATIONS

Italian Search Report dated May 11, 2020 from counterpart Italian App No. 201900016934.

*Primary Examiner* — Mahmoud Gimie
(74) *Attorney, Agent, or Firm* — Shuttleworth & Ingersoll, PLC; Timothy Klima

(57) ABSTRACT

Described is a lawn mower robot comprising:
a frame;
cutting means configured for cutting grass, adjusting the height;
movement means, associated with the frame for moving it along a working trajectory in a feed direction;
a system for detecting the presence of grass in an area of ground along the working trajectory in the feed direction;
a computerised command and control unit operatively associated with said cutting means, movement means and detection system;
said detection system comprises a radar sensor configured for sending an electromagnetic wave towards the ground, receiving a reflected electromagnetic wave from the (Continued)

ground and transmitting a signal representing said reflected electromagnetic wave to the command and control unit.

15 Claims, 3 Drawing Sheets

(56) References Cited

U.S. PATENT DOCUMENTS

2022/0248599 A1* 8/2022 Joo ...................... G05D 1/0274

FOREIGN PATENT DOCUMENTS

| WO | 2007109624 A2 | 9/2007 | |
|---|---|---|---|
| WO | WO-2007109627 A2 * | 9/2007 | ........... A01D 34/008 |
| WO | WO-2016103068 A1 * | 6/2016 | ........... A01B 69/008 |
| WO | 2018108180 A1 | 6/2018 | |
| WO | WO-2019226415 A1 * | 11/2019 | ........... A01D 34/008 |

* cited by examiner

LAWN MOWER ROBOT

This application claims priority to Italian Patent Application 102019000016934 filed Sep. 23, 2019, the entirety of which is incorporated by reference herein.

This invention relates to the technical sector of gardening systems.

In particular, the invention relates to a lawn mower robot with a system for detecting the presence of grass.

The invention also relates to a method for controlling the cutting means of the lawn mower robot.

Lawn mower robots of known type usually comprise a load-bearing frame, generally having an outer body, to which are associated cutting means for the maintenance of the lawn, robot movement means for moving the robot inside a working area, a system for detecting obstacles along the trajectories of movement and a system for detecting the presence of grass in the area affected by the cutting means.

The movement means are typically made using a plurality of wheels of which at least one is motor-driven, that is, connected to a motor configured to rotate it, thus allowing the feeding of the robot in the working area.

The movement means are also designed to orient the wheels in such a way as to modify the trajectory adopted by the robot, allowing them to progressively operate on the entire working area.

The system for detecting obstacles typically comprises a set of components designed to detect the presence of obstacles along the trajectories and to send signals to suitable processing units for modifying the trajectories, thereby minimising the possibility of undesired impacts.

The systems for detecting the presence of grass are currently designed as systems equipped with video cameras designed to acquire images of the area of ground close to being affected by the cutting means for checking the actual presence of grass to be cut.

It is evident that the operating efficiency of the robot is greatly influenced by the efficiency of its system for detecting the presence of grass, since it determines its capacity to operate only on the areas of lawn which require maintenance operations.

In effect, it is appropriate to avoid multiple passages in areas of the lawn already treated previously.

Moreover, the passage of the cutting means on areas which do not require maintenance operations may be, as well as particularly inefficient in terms of energy, also dangerous for the structure of the robot.

The passage of the cutting means on particularly resistant surfaces, for example paved areas or a ground having stones and/or exposed roots, can cause, in effect, the contact between the cutting means and said highly robust elements, with a consequent damage to the cutting means.

The systems for detecting the presence of grass with video cameras used, currently, in lawn mower robots are particularly efficient in ideal working conditions, but have serious critical issues when said ideal operating conditions are disturbed.

The video cameras need, in effect, to be exposed relative to the frame of the lawn mower robot in order to acquire images of the ground to be maintained.

Said positioning exposes the video cameras to atmospheric agents and soiling agents, such as residues of grass, dust and mud, which settle on the transparent acquisition surfaces.

The images acquired in these conditions are therefore deteriorated and cause a reduction in the efficiency in recognising the presence (or absence) of grass in the areas affected by the cutting means.

Particular lighting conditions, such as dawn and dusk, also cause problems to the systems for detecting the presence of grass with video cameras, since high reflection and refraction phenomena of the sun's rays considerably disturb the acquired images of the grass.

In this context, the technical purpose which forms the basis of the invention is to provide a lawn mower robot equipped with a system for detecting the presence of grass which is highly efficient.

In particular, the aim of the invention is to provide a lawn mower robot equipped with a system for detecting the presence of grass which is robust and reliable, which is able to guarantee continuity of performance even when disturbed by the action of atmospheric agents or soiling agents.

Another aim of the invention is to provide a lawn mower robot equipped with a system for detecting the presence of grass which has a smaller size and production costs less than that of the prior art systems for detecting the presence of grass.

Yet another aim of the invention is to provide a method for controlling the movement means which makes the process for maintenance of the grass particularly efficient.

The technical purpose indicated and the aims specified are substantially achieved by a lawn mower robot and a method for controlling the cutting means, comprising the technical features described in one or more of the appended claims.

Further features and advantages of this invention are more apparent in the detailed description below, with reference to a preferred, non-restricting, embodiment of a lawn mower robot as illustrated in the accompanying drawings, in which.

With reference to the accompanying drawings, the numeral 1 denotes a lawn mower robot, referred to below simply as the robot 1.

The robot 1 is of the self-propelled type, that is to say, it is movable in a substantially autonomous manner along a working trajectory which extends inside an area of ground G, in particular to perform an operation for maintenance of the surface of the area.

In this context, the area of ground G may be, for example, a lawn, a garden or more generally any surface on which it may be necessary to perform, at least partially, an operation for cutting and adjusting the height of the grass.

As illustrated in the accompanying drawings, the robot 1 comprises a frame 2.

The frame 2 substantially has the function of supporting, and, if necessary, protecting, the components, described below, which are necessary for the operation of the robot 1.

Still more preferably, the frame 2 comprises a guard, that is to say, an outer cover, generally made of plastic material.

Said guard is designed to contain and protect the components of the robot 1 from the weather conditions or any impacts with obstacles present in the area of ground G.

The robot 1 also comprises cutting means 3 associated with, in particular mounted on, the frame 2.

Preferably, the cutting means 3 comprise one or more cutting blades 3R, usually made of metal material, designed to perform operations for cutting the grass.

The cutting means 3 also comprise suitable drive means 3M (for example, electric motors) configured to generate the power necessary for moving the cutting blades 3R for cutting the grass.

Figure 2:
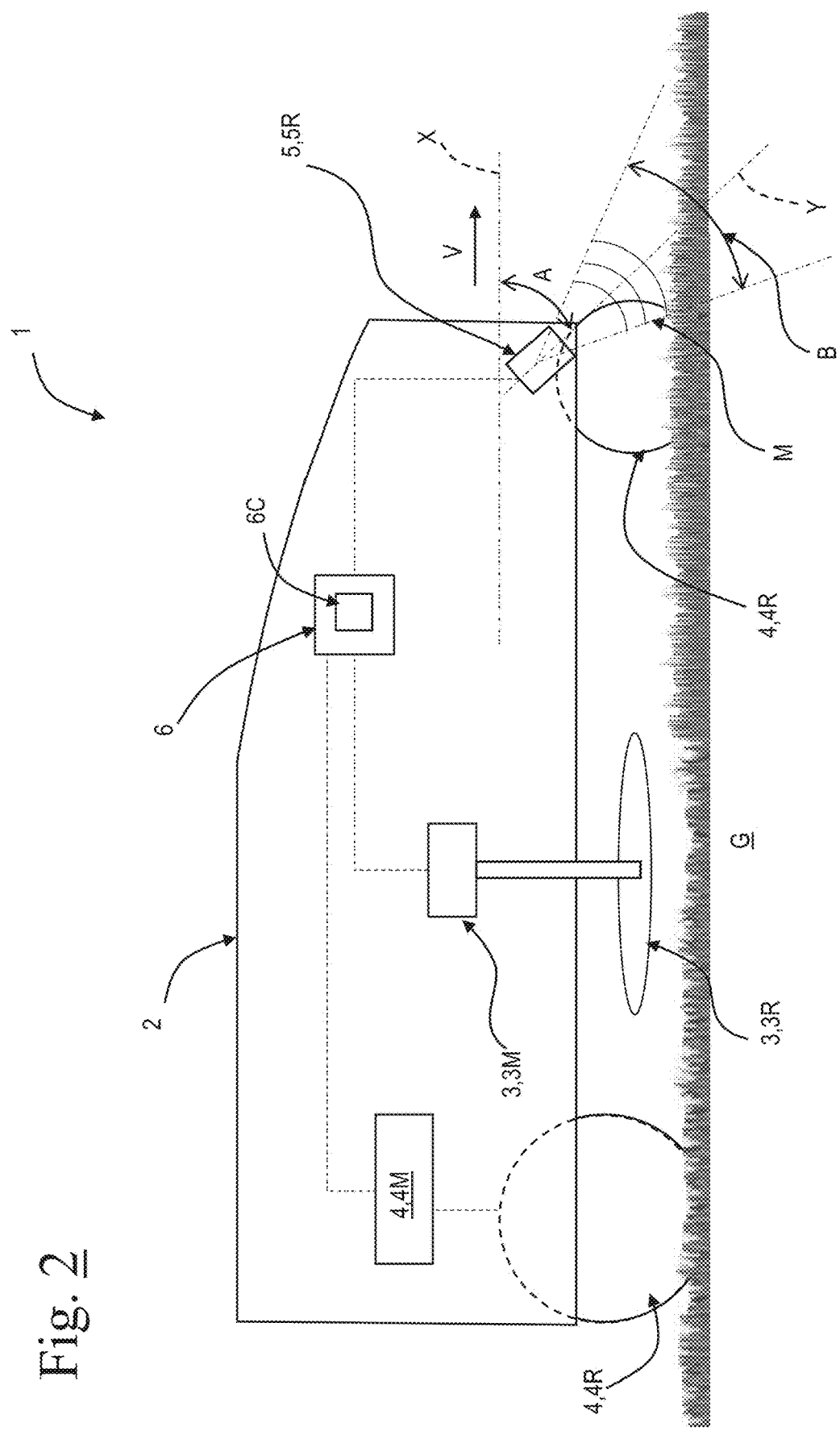
FIG. 2 shows a schematic cross-section view according to the plane A-A of the lawn mower robot of FIG. 1, in use in a first configuration.
Figure 3:
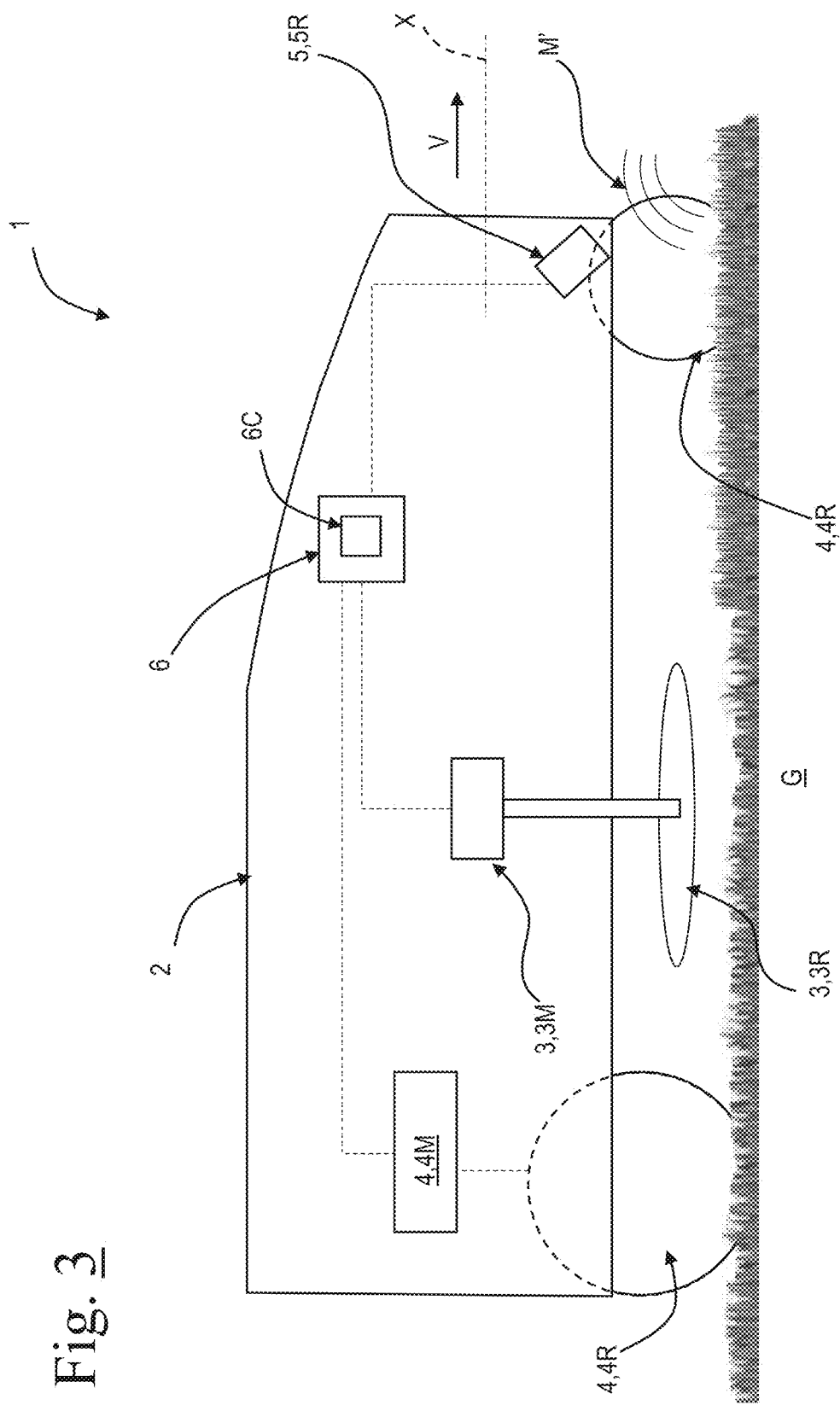
FIG. 3 shows the lawn mower robot, according to the same cross-section view of FIG. 2, in use in a second configuration.

Generally speaking, as illustrated in FIGS. 2 and 3, the cutting means 3 comprise a plurality of rotary cutting blades 3R rotated by the motor 3M, preferably an electric motor.

Figure 1:
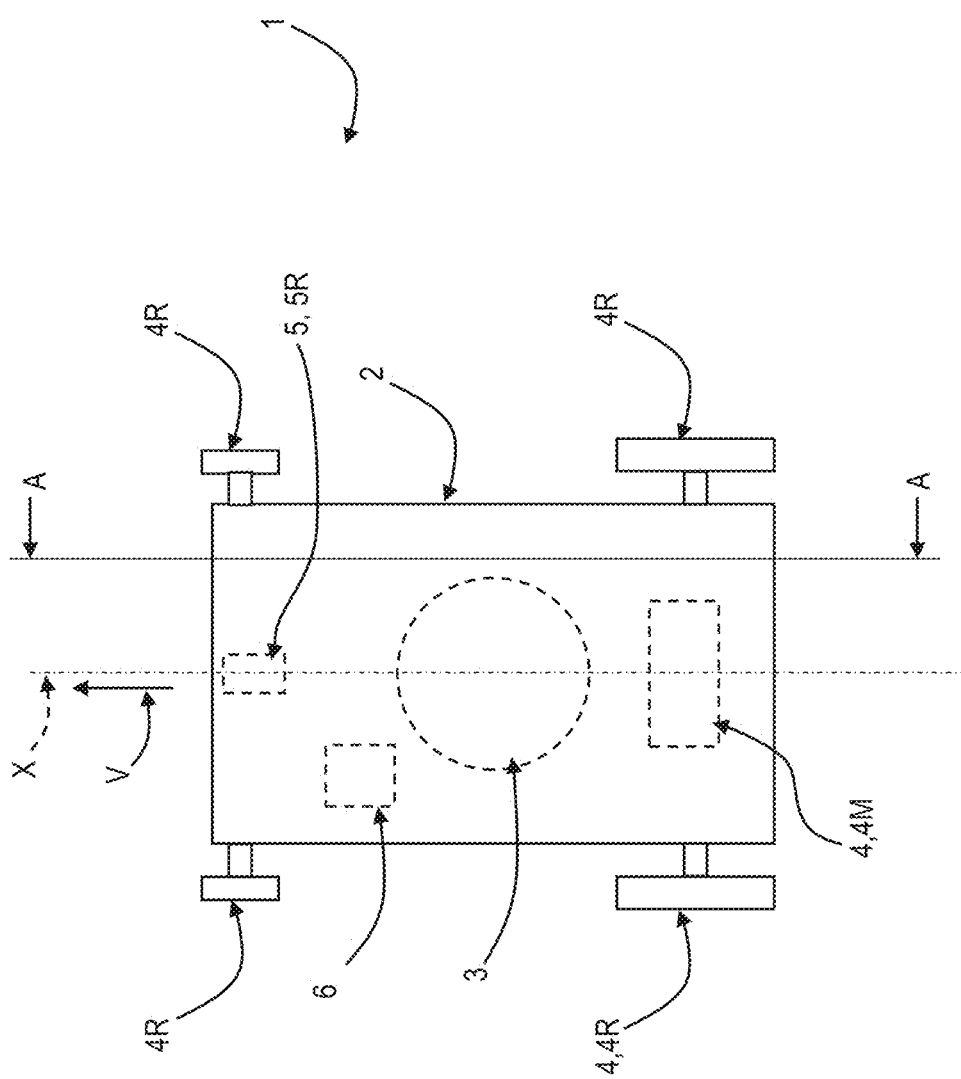
FIG. 1 shows a schematic top view of the lawn mower robot according to the invention.

As illustrated in particular in FIG. 1, the robot 1 comprises movement means 4 operatively connected to, in particular mounted on, the frame 2.

Said movement means 4 are configured for moving the robot 1 inside the area of ground G, in particular along the working trajectory X in a feed direction V.

Preferably, the movement means 4 comprise a plurality of wheels 4R, at least one of which is a drive wheel, and a rotation motor 4M, operatively connected to said drive wheel.

Still more preferably, the movement means 4 comprise an orientation motor, not illustrated, operatively connected to at least one adjustable wheel of the plurality of wheels 4R, that is to say, a wheel which is able to rotate about a substantially vertical axis of rotation.

The movement means 4 therefore perform the function of moving the robot 1 inside the area of ground G to be maintained.

In particular, the drive wheels allow the forward movement along the working trajectory X, whilst the adjustable wheels change the direction of said working trajectory X when necessary (for example, when obstacles are detected along the working trajectory or the edges of the area to be maintained are reached).

Again as illustrated in the accompanying drawings, the robot 1 comprises a system 5 for detecting the presence of grass in an area of ground G along the working trajectory X in the feed direction V.

In other words, the detection system 5 is configured to recognise the presence of grass in the area of ground G which is about to be affected by the cutting means 3 during the movement of the robot 1 along the working trajectory X in the feed direction V.

In particular, the detection system 5 comprises a radar sensor 5R.

The radar sensor 5R is configured for sending an electromagnetic wave M and receiving a reflected electromagnetic wave M'.

More specifically, in use, the radar sensor 5R is configured for sending the electromagnetic wave M, directing it towards the area of ground G along the working trajectory X in the feed direction V.

This electromagnetic wave M, after intercepting the area of ground G, is reflected in the form of a reflected electromagnetic wave M' which, moving in the opposite direction along the trajectory of propagation of the electromagnetic wave M, is received by the radar sensor 5R.

Preferably, the radar sensor 5R is configured to send an electromagnetic wave M having a frequency of between 0 Hz and 300 GHz, that is to say, an electromagnetic wave M belonging to the range of radio waves.

More preferably, the radar sensor 5R is configured to send an electromagnetic wave M having a frequency of between 10 GHz and 120 GHz, that is to say, an electromagnetic wave M belonging to the range of microwaves.

According to an embodiment, the radar sensor 5R is configured to send an electromagnetic wave M having a frequency of 60 GHz, that is to say, an electromagnetic wave having a wavelength almost equal to 5 mm.

Preferably, the radar sensor 5R is a radar sensor of the type with coherent pulses.

The radar sensor 5R is operatively connected to, in particular mounted on, the frame 2.

Preferably, the radar sensor 5R is positioned inside the frame 2.

Advantageously, the positioning inside the frame 2, in particular inside the guard, allows protection against impacts of the radar sensor 5R, without affecting its operation since said electromagnetic wave M and said reflected electromagnetic wave M' are able to propagate through the material, generally plastic (for example ABS), from which the guard is made, provided its thickness is, preferably, less than 2 cm.

Preferably, the radar sensor 5R is positioned inside a box-shaped casing, associated with the frame 2.

Preferably, the radar sensor 5R is positioned at a height relative to the ground G of between 5 cm and 30 cm.

Still more preferably, the radar sensor 5R is positioned at a height relative to the ground G of between 10 cm and 20 cm.

According to another aspect, the radar sensor 5R sends the electromagnetic wave M in an area of ground G along the working trajectory X in the feed direction V.

In other words, the radar sensor 5R sends said electromagnetic wave M in the area of ground G which is about to be affected by the cutting means 3 during the movement of the robot 1 along the working trajectory X in the feed direction V.

According to another aspect, the radar sensor 5R has a main axis Y of emission of the electromagnetic wave M, that is to say, a direction along which the power of the electromagnetic wave M is mainly directed and concentrated.

Preferably, the main axis of emission Y is inclined towards the ground G by an angle of emission A relative to the working trajectory X.

More preferably, the angle of emission A is between 0° and 90°.

According to another aspect, the radar sensor 5R is equipped with an angle of vision B of between 50° and 180°.

In this description, the expression "angle of vision" means the angle in which almost all of the emission power of the electromagnetic wave is concentrated, so that the radar sensor 5R acts as a directional antenna.

In this way, it is possible to convey the power of the electromagnetic wave in a single area of ground G of interest and not disperse most of it in directions of little importance, as would occur in the case of a multi-directional antenna.

Advantageously, due to the angle of emission A and the angle of vision B, the power of the reflected electromagnetic wave M' detected by the radar sensor 5R is also maximum.

Still more advantageously, the height above the ground at which the radar sensor 5R is positioned, the angle of emission A and the angle of vision B allow the electromagnetic wave to concentrate most of its power in an area of ground G—along the working trajectory X in the feed direction V—located at a distance of between 4 cm and 30 cm.

The area of ground G is the one closest to be affected by the cutting means 3 during the feeding of the robot 1 in its movement along the working trajectory X in the feed direction V.

According to another aspect, the radar sensor 5R is configured for emitting a plurality of electromagnetic waves M separated temporally by intervals of between 0.1 ms and 10 ms, more preferably between 0.2 ms and 5 ms, even more preferably substantially equal to 0.390 ms.

In other words, the radar sensor 5R is configured for emitting a plurality of electromagnetic waves M at an emission frequency of between 100 Hz and 10000 Hz, more preferably between 200 Hz and 5000 Hz, even more preferably at a frequency of 2560 Hz.

Preferably, the time interval is fixed and constant over time (which can be programmed or decided at the stage of manufacturing the radar sensor 5R).

In other words, the radar sensor 5R, during use, repeats at regular intervals the sending of electromagnetic waves M and consequent reception of reflected electromagnetic waves M'.

According to one embodiment, the radar sensor 5R is configured for emitting a plurality of electromagnetic waves M at an emission frequency of 2560 Hz, that is to say, separated by time intervals almost equal to 0.390 ms.

According to another embodiment, the radar sensor 5R is configured for emitting a plurality of electromagnetic waves M separated in terms of time by intervals of 5 ms.

It should be noted that, in both embodiments, given the height above the ground and the inclination of the radar sensor 5R, the flight time of the electromagnetic wave M and the reflected electromagnetic wave M' is considerably less than the time interval between two consecutive transmissions of electromagnetic waves M.

Thus, the receiving of the reflected electromagnetic wave M' occurs before the transmission of a new electromagnetic wave M.

Moreover, due to the fact that the robot 1, in use, rests substantially always on the ground G and that the radar sensor 5R is inclined towards the ground, the possibility is excluded that no reflected electromagnetic wave M' is detected, unlike what occurs, in other sectors, in the radar systems used for the detection of obstacles.

As illustrated in particular in FIGS. 2 and 3, the robot 1 comprises a computerised command and control unit 6, operatively associated with the cutting means 3, the movement means 4 and the detection system 5.

The command and control unit 6 is denoted below simply as the unit 6.

Regarding the association between the unit 6 and the detection system 5, the latter, in particular through the radar sensor 5R, is configured for sending a signal representing the reflected electromagnetic wave M' to the unit 6.

Preferably, the signal representing the reflected electromagnetic wave M' is of the electrical type.

For simplicity, reference will be made below to processing by the unit 6 (or its sub-parts) of the reflected electromagnetic wave M': this is to be understood as processing by the unit 6 of the signal representing the reflected electromagnetic wave M'.

The unit 6 is configured for determining the presence of grass in the area of ground G along the working trajectory X in the feed direction V as a function of the reflected electromagnetic wave M'.

The terms determining, identifying, indicating, detecting, checking, checking, recognising, classifying and discriminating the presence of grass will hereinafter be used: these terms are to be understood as synonyms to indicate an activity for identifying the presence or absence of grass in a predetermined area of ground G.

According to one aspect, the unit 6 is configured to control the movement means 4 in such a way as to allow the movement (forwards or backwards) along the working trajectory X and the modification of the working trajectory X.

Further, according to another aspect, the unit 6 may be configured to activate and/or deactivate the operatively associated cutting means 3, by means of suitable electrical control signals.

The unit 6 comprises at least one classification module 6C, which determines the presence of grass in the area of ground G along the working trajectory X in the feed direction V as a function of the reflected electromagnetic wave M' transmitted by the radar sensor 5C.

The classification module 6C may comprise hardware and/or software elements.

The classification module 6C may have a centralised architecture (single macro-module) or distributed architecture (several micro-modules) inside the unit 6.

According to another aspect, the classification module 6C comprises at least one processing unit, not illustrated, configured for processing the reflected electromagnetic wave M' and identifying the presence of grass in the area of ground G along the working trajectory X in the feed direction V.

In particular, the classification module 6C comprises at least one classification algorithm.

The classification module 6C comprises, in this regard, a memory (not illustrated), configured for the persistence of the classification algorithm.

The classification algorithm, as a function at least of a signal representing the reflected electromagnetic wave M', is configured for distinguishing between the presence or absence of grass in the area of ground G along the working trajectory X in the feed direction V, that is to say, the area of ground G intercepted previously by the electromagnetic wave M.

Preferably, said classification algorithm is a supervised machine learning algorithm, with off-line learning before assembly of the robot on a data set already classified (labelled dataset).

According to an embodiment, the at least one classification algorithm is a decision-making tree, for example a gradient boosting algorithm.

According to another embodiment, the at least one classification algorithm is a linear classifier, for example a machine with support vectors (support-vector machine).

According to yet another embodiment, the at least one classification algorithm is a non-linear classifier, for example a logistic regression algorithm (logit model).

According to more advanced embodiments, the classification module 6C comprises a plurality of classification algorithms, operating in a combined fashion (that is, in parallel) on the same reflected electromagnetic wave M'.

More specifically, each classification algorithm discriminates the presence or absence of grass independently of the other algorithms, if necessary using different characteristics of the reflected electromagnetic wave M'; the results are then used by the classification module 6C in a combined fashion, so that each contributes (in the same way or with a variable weight) to reaching a final overall classification result (presence or absence of grass).

This type of operation is commonly known as mixture of experts, wherein a group of experts (the individual classification algorithms) are compared and used together to achieve a final result.

According to an embodiment, the individual classification algorithms belong to the same type, for example gradient boosting.

According to another embodiment, the individual classification algorithms belong to different types, for example the algorithms are divided equally between gradient boosting and support-vector machines.

Advantageously, the use of a plurality of classification algorithms guarantees a greater reliability and robustness of the overall result, since the situations of incorrect classification of a single algorithm are counterbalanced by the result of the other algorithms, which therefore resolve them.

In this way, the critical cases of systematic classification error are reduced to a minimum and the activity for discrimination of the presence of grass is optimum.

Preferably, the classification module 6C comprises a module for sampling the reflected electromagnetic wave M', configured for deriving a finite number of samples from the reflected electromagnetic wave M'.

Thus, when the reflected electromagnetic wave M' is sampled by the sampling module, the classification module 6C determines the presence or absence of grass in the area of ground G along the working trajectory X in the feed direction V as a function of the value of a finite number of samples of the reflected electromagnetic wave M'.

In other words, the classification module 6C, and in particular the at least one classification algorithm, use a sampled version (from the sampling module) of the reflected electromagnetic wave M' to discriminate the nature (presence or absence of grass) of the area of ground G about to be affected by the cutting means 3.

When the classification module 6C uses one or more classification algorithms, these generally require a finite number of samples of the signal to be analysed as input (in this case the reflected electromagnetic wave M').

Preferably, the classification module 6C determines the presence of grass in the area of ground G along the working trajectory X in the feed direction V as a function of the spatial correlation between the samples of the reflected electromagnetic wave M' transmitted by the radar sensor 5C.

In effect, advantageously, samples of the reflected electromagnetic wave M' resulting from spatially adjacent points are correlated with each other and, therefore, the relation may be used by the classification module 6C to increase the effectiveness of the process for recognising the presence of grass.

In other words, it is highly likely that spatially nearby points in the area of ground G will have the same nature (grass/no grass) and it is therefore advantageous to use this statistical dependency to increase the degree of reliability of the one or more classification algorithms.

According to another aspect, the classification module 6C determines the presence of grass in the area of ground G along the working trajectory X in the feed direction V as a function of the time trend of several reflected electromagnetic waves M' transmitted by the radar sensor 5C.

More specifically, the classification module 6C uses several reflected electromagnetic waves M' transmitted by the radar sensor 5R (resulting from the reflection of a plurality of electromagnetic waves M sent by the radar sensor at fixed or variable time intervals) for taking decisions regarding the presence of grass in the area of ground G along the working trajectory X in the feed direction V.

In other words, a plurality of reflected electromagnetic waves M' is linked and is used by the classification module 6C, preferably by the at least one classification algorithm, for recognising the presence of grass.

Preferably, the classification module 6C determines the presence of grass in the area of ground G along the working trajectory X in the feed direction V as a function of the temporal correlation between the samples of the reflected electromagnetic wave M' transmitted by the radar sensor 5C.

In effect, advantageously, reflected electromagnetic waves M' received at time intervals in the order of 5-10 ms are highly correlated with each other (also due to the speed at which the robot 1 operates) and, therefore, the relationship may be used by the classification module to increase the effectiveness of the process for recognising the presence of grass.

In other words, given the reduced speed at which the robot 1 generally moves, two electromagnetic waves M sent consecutively over time intercept zones of ground G which are greatly superposed.

Therefore, two reflected electromagnetic waves M' received consecutively over time will have very similar features, which can be used in a combined manner by the classification module 6C to increase the reliability of the grass/absence of grass discrimination process.

Even more preferably, the classification module 6C determines the presence of grass in the area of ground G along the working trajectory X in the feed direction V as a function both of the time correlation and the spatial correlation between the samples of the plurality of reflected electromagnetic waves M' transmitted by the radar sensor 5C.

Advantageously, the use of both types of correlation (space and time) guarantees a greater level of reliability of the process for recognising the presence of grass compared with the use of a single type of correlation.

According to an embodiment, the sampling module samples a finite number of samples for each reflected electromagnetic wave M'.

Preferably, each sample derived from the reflected electromagnetic wave M' corresponds to the electromagnetic wave reflected from a point located at a predetermined distance from the radar sensor 5R.

Again preferably, the sampling module samples from the reflected electromagnetic wave M' a finite number of samples corresponding to points of the ground G equally spaced from a projection of the radar sensor 5R on the ground G.

By way of a non-limiting example, for each reflected electromagnetic wave M', the sampling module samples four samples, corresponding to points on the ground G located respectively at 12 cm, 18 cm, 24 cm and 30 cm from a projection of the radar sensor 5R on the ground G.

In this embodiment, the unit 6 is configured to receive the samples derived from a plurality of reflected electromagnetic waves M' picked up over time by the radar sensor 5R and to link in sequences, preferably in chronological order, the samples corresponding to the same distance received from each reflected electromagnetic wave M'.

Again according to this embodiment, the unit 6 is configured for calculating a frequency spectrum for each sequence of said samples corresponding to the same distance.

In other words, for each linked sequence of samples corresponding to the same distance, the unit 6 calculates the frequency spectrum, preferably through a Discrete Fourier Transform (DFT).

Therefore, the unit 6 calculates a number of frequency spectra equal to the number of distances from the radar sensor 5R for which the sampling from the sampling module has been performed.

In this embodiment, the classification module 6C is configured for determining the presence of grass in the area of ground G along the working trajectory X in the feed direction V as a function of at least part of said frequency spectra of the sequences of said samples corresponding to a same distance from the radar sensor 5R, if necessary linked with other features, for example descriptive features of the motion of the robot 1.

According to one aspect, the unit 6 controls the movement means 4, associated with it, as a function of the result of the process for classifying the presence of grass carried out by the classification module 6C.

More generally speaking, the unit 6 controls the movement means 4 as a function of the reflected electromagnetic wave M'.

According to a further aspect, the unit 6 is configured for controlling the rotation motor 4M for a feeding or a return of the robot 1 along the working trajectory X.

According to yet another aspect, the unit 6 is configured for controlling the orientation motor for a modification of the working trajectory X, that is, a rotation of the feed or return direction of the robot 1.

By way of a non-limiting example, the unit 6 is configured to control the locking of the wheels 4R, the consequent return of the wheels if the unit 6 has detected the absence of grass.

This allows the robot 1 to return to an area of ground G already treated and modify the working trajectory X to search for an area of ground G having grass.

Optionally, the unit 6 may activate or deactivate the cutting means 3, associated with it, as a function of the result of the process for classifying the presence of grass carried out by the classification module 6C.

In particular, according to this aspect, the unit 6 can deactivate the cutting means 3, when the classification module 6C determines the absence of grass, and can activate the cutting means 3, when the classification module 6C determines the presence of grass.

Also defined according to the invention is a method for controlling the movement means 4 of a lawn mower robot 1 which comprises the steps described below.

Firstly, the method for controlling the movement means 4 comprises a step of preparing said robot 1 comprising cutting means 3, means 4 for moving the robot 1, a system 5 for detecting the presence of grass in an area of ground G along a working trajectory X in a feed direction V and a computerised command and control unit (6) operatively associated with said cutting means 3, movement means 4 and detection system 5.

In particular, said detection system 5 comprises a radar sensor 5R designed for sending an electromagnetic wave M and for receiving a reflected electromagnetic wave M'.

Subsequently, the method for controlling the movement means 4 comprises a step of sending, by the radar sensor 5R, the electromagnetic wave M in an area of ground G close to the cutting means 3.

Preferably, said area of a ground G close to the cutting means 3 is an area of ground G along the working trajectory X in the feed direction V, that is to say, an area of ground which is about to be affected by the cutting means 3 during the movement of the robot 1 along the working trajectory X in the feed direction V.

The method for controlling the movement means 4 also comprises a step of receiving, by the radar sensor 5R, the reflected electromagnetic wave M' from the area of ground G close to the cutting means 3.

In effect, by striking the area of ground G close to the cutting means 3, at least part of the electromagnetic wave M transmitted by the radar sensor 5R is reflected, follows in the opposite direction the propagation route of said electromagnetic wave M and is received, as reflected electromagnetic wave M', by the radar sensor 5R.

Subsequently, the method for controlling the movement means 4 comprises a step of sending, by the radar sensor 5R, a signal representing said reflected electromagnetic wave M' to the command and control unit 6.

In this step, a sampling and a quantisation of the reflected electromagnetic wave M' may, preferably, occur, which therefore reaches the control unit as a discrete signal.

The method for controlling the movement means 4 therefore comprises a step for processing the reflected electromagnetic wave M', by the command and control unit 6, for determining the presence of grass in the area of ground G close to the cutting means 3.

In this step, preferably, the command and control unit 6 uses at least one classification algorithm from those indicated above in this description.

Lastly, the method for controlling the movement means 4 comprises a step of controlling the movement means 4 of the lawn mower robot 1 as a function of the results of the processing step.

Described below is an example for adjusting the movement means 4, if it is necessary to travel along the edge of the area of ground G to be maintained to perform the mowing at the edge.

In this situation, when the presence of grass is detected in the processing step, the adjustment means 4 are adjusted (that is, the working trajectory X is changed) in such a way that the movement of the robot 1 is directed towards the absence of grass.

On the contrary, that is to say, when the absence of grass is detected in the processing step, the adjusting means 4 are adjusted (that is, the working trajectory X is changed) in such a way that the movement of the robot 1 is directed towards the presence of grass.

In this way, the robot 1 travels along oscillating trajectories substantially parallel to the edge of the garden G to be maintained and an optimum maintenance of the area of ground G is guaranteed.

According to the invention, a lawn mower robot is provided equipped with a system for detecting the presence of grass and a method for controlling the cutting means which allow particularly efficient maintenance of an area of ground having, at least partly, grass.

In particular, a lawn mower robot is advantageously illustrated equipped with a system for detecting the presence of grass which is robust and reliable, which is able to guarantee continuity of performance even when disturbed by the action of atmospheric agents or soiling agents.

In effect, the radar sensor is immune to the action of atmospheric agents or dirtying agents.

Moreover, a lawn mower robot equipped with a system for detecting the presence of grass is described which has a smaller size and lower production costs than that of the prior art systems for detecting the presence of grass, given the smaller dimensions and the lower production costs of the radar sensors compared with traditional video cameras.

Lastly, a method is provided for actuating the movement means of the lawn mower robot which, advantageously, guarantees an optimum treatment of the areas of ground to be maintained.

The invention claimed is:
1. A lawn mower robot comprising:
a frame;
a cutting device including a cutting surface configured for cutting grass to adjust a height of the grass;
a movement device including a motor attached to the frame for moving the lawn mower robot along a working trajectory in a feed direction;

a detection system for detecting a presence of grass in an area of ground along the working trajectory in the feed direction;

a computerized command and control unit operatively connected with the cutting device, the movement device and the detection system;

said detection system comprising a radar sensor configured and inclined toward the ground for sending at least one electromagnetic wave towards the ground, receiving at least one reflected electromagnetic wave from the ground and transmitting at least one signal representing said at least one reflected electromagnetic wave to the command and control unit;

the command and control unit comprising at least one classification module, which determines the presence of grass in the area of ground along the working trajectory in the feed direction as a function of the at least one signal of the at least one reflected electromagnetic wave;

said classification module comprising a sampling module for sampling the at least one reflected electromagnetic wave, configured for deriving a finite number of samples from the at least one reflected electromagnetic wave, the classification module determining the presence of grass in the area of ground along the working trajectory in the feed direction as a function at least of the finite number of samples.

2. The lawn mower robot according to claim 1, wherein the at least one electromagnetic wave has a frequency of between 0 Hz and 300 GHz.

3. The lawn mower robot according to claim 1, wherein the radar sensor has a main axis of emission of the at least one electromagnetic wave and said main emission axis is inclined towards the ground by an emission angle of between 0° and 90° relative to the working trajectory.

4. The lawn mower robot according to claim 1, wherein the radar sensor is configured with a viewing angle of between 50° and 180°.

5. The lawn mower robot according to claim 1, wherein the radar sensor is positioned inside the frame.

6. The lawn mower robot according to claim 1, wherein the radar sensor is positioned at a height relative to the ground of between 5 cm and 30 cm.

7. The lawn mower robot according to claim 1, wherein the at least one electromagnetic wave includes a plurality of electromagnetic waves, the at least one reflected electromagnetic wave incudes a plurality of reflected electromagnetic waves, the at least one signal includes a plurality of signals, and wherein the radar sensor sends the plurality of electromagnetic waves separated temporally by intervals of between 0.1 ms and 10 ms.

8. The lawn mower robot according to claim 7, wherein the classification module determines the presence of grass in the area of ground along the working trajectory in the feed direction as a function of a time trend of the plurality of signals, of the plurality of reflected electromagnetic waves, transmitted by the radar sensor.

9. The lawn mower robot according to claim 8, wherein the sampling module derives a predetermined number of samples from each of the plurality of reflected electromagnetic waves, each derived sample corresponding to a predetermined distance from the radar sensor, and wherein the command and control unit links in sequence the samples corresponding to a same distance from the radar sensor derived from the plurality of reflected electromagnetic waves and calculates a frequency spectrum of each sequence of said linked samples corresponding to the same distance from the radar sensor.

10. The lawn mower robot according to claim 9, wherein the classification module is configured for determining the presence of grass in the area of ground along the working trajectory in the feed direction as a function of at least part of said frequency spectrum of each sequence of said linked samples corresponding to the same distance from the radar sensor.

11. The lawn mower robot according to claim 8, wherein the classification module determines the presence of grass in the area of ground along the working trajectory in the feed direction as a function of a spatial correlation between the samples of the plurality of reflected electromagnetic waves.

12. The lawn mower robot according to claim 7, wherein the classification module determines the presence of grass in the area of ground along the working trajectory in the feed direction as a function of a time correlation between the samples of the plurality of reflected electromagnetic waves.

13. The lawn mower robot according to claim 1, wherein the command and control unit controls the movement device as a function of the at least one reflected electromagnetic wave.

14. A method for controlling movement of a lawn mower robot comprising the following steps:

providing the lawn mower robot comprising a cutting device comprising a cutting surface, a movement device including a motor for moving the lawn mower robot, a detection system for detecting the presence of grass in an area of ground along a working trajectory in a feed direction and a computerized command and control unit operatively connected with the cutting device, the movement device and the detection system; said detection system comprising a radar sensor inclined toward the ground;

sending, by the radar sensor, an electromagnetic wave in an area of ground close to the cutting device;

receiving, by the radar sensor, a reflected electromagnetic wave from the area of ground close to the cutting device;

sending, by the radar sensor, a signal representing said reflected electromagnetic wave to the command and control unit;

processing the reflected electromagnetic wave, by the command and control unit, for determining the presence of grass in the area of ground close to the cutting device;

controlling the movement device as a function of results of the processing step.

15. A lawn mower robot comprising:

a frame;

a cutting device including a cutting surface configured for cutting grass to adjust a height of the grass;

a movement device including a motor attached to the frame for moving the lawn mower robot along a working trajectory in a feed direction;

a detection system for detecting a presence of grass in an area of ground along the working trajectory in the feed direction;

a computerized command and control unit operatively connected with the cutting device, the movement device and the detection system;

said detection system comprising a radar sensor configured and inclined toward the ground for sending at least one electromagnetic wave towards the ground, receiving at least one reflected electromagnetic wave from the ground and transmitting at least one signal representing said at least one reflected electromagnetic wave to the command and control unit;

the command and control unit comprising at least one classification module, which determines the presence of grass in the area of ground along the working trajectory in the feed direction as a function of the at least one signal of the at least one reflected electromagnetic wave;

said classification module comprising a sampling module for sampling the at least one reflected electromagnetic wave, configured for deriving a finite number of samples from the at least one reflected electromagnetic wave, the classification module determining the presence of grass in the area of ground along the working trajectory in the feed direction as a function at least of the finite number of samples;

wherein the radar sensor has a main axis of emission of the at least one electromagnetic wave and said main emission axis is inclined towards the ground by an emission angle of between 0° and 90° relative to the working trajectory;

wherein the at least one electromagnetic wave includes a plurality of electromagnetic waves, the at least one reflected electromagnetic wave incudes a plurality of reflected electromagnetic waves, the at least one signal includes a plurality of signals, and wherein the radar sensor sends the plurality of electromagnetic waves separated temporally by intervals of between 0.1 ms and 10 ms;

wherein the classification module determines the presence of grass in the area of ground along the working trajectory in the feed direction as a function of a time trend of the plurality of signals, of the plurality of reflected electromagnetic waves, transmitted by the radar sensor.

* * * * *